United States Patent [19]

Pierce

[11] 4,373,117
[45] Feb. 8, 1983

[54] DC TO DC CONVERTER FOR LINE POWERED MODEM

[75] Inventor: O. Leon Pierce, Huntsville, Ala.
[73] Assignee: Universal Data Systems, Inc., Huntsville, Ala.
[21] Appl. No.: 203,109
[22] Filed: Nov. 3, 1980
[51] Int. Cl.³ .......................................... H04M 19/00
[52] U.S. Cl. ..................................... 179/2 DP; 375/8
[58] Field of Search ............... 179/2 DP, 2 C, 70, 77, 179/170 J; 375/8

[56] References Cited
U.S. PATENT DOCUMENTS 3,539,727 11/1970 Pasternack ..................... 179/2 DP
4,171,467 10/1979 Evenchik ........................ 179/2 DP

OTHER PUBLICATIONS

The Bell System Data Set Catalog, 1972, pp. 2-56.
Bell Systems Data Set 113A Product Literature-Description and Operation, pp. 1-6, Installation and Connection, pp. 1-7, and Test Procedure, pp. 1-4, 1972.

Primary Examiner—A. D. Pellinen
Assistant Examiner—James L. Dwyer
Attorney, Agent, or Firm—Weingarten, Schurgin, Gagnebin & Hayes

[57] ABSTRACT

A DC to DC converter circuit for use in a telephone line powered modem and operative to convert a voltage derived from the telephone line to operating voltages required for modem operation.

10 Claims, 2 Drawing Figures

DC TO DC CONVERTER FOR LINE POWERED MODEM

FIELD OF THE INVENTION

This invention relates to data modems for coupling data to and from a telephone line and more particularly to a DC to DC converter circuit employed in a telephone line powered modem for converting a voltage derived from the telephone line to operating voltages required for modem operation.

BACKGROUND OF THE INVENTION

A modem is disclosed in copending application of O. Leon Pierce, Mark C. Smith, and R. Byron Driver, entitled Line Powered Modem filed contemporaneously herewith, and assigned to the same assignee as this invention, in which the entire operating power for the modem circuits is derived from the available telephone line power. This modem includes an RS232 output interface circuit which provides a carrier detect signal and a received data signal which must be within predetermined voltage ranges to be properly received by the associated business machine or other utilization apparatus to which the modem is connected. This output interface circuit must be appropriately powered to provide the intended output signal levels.

SUMMARY OF THE INVENTION

In brief, the present invention provides a DC to DC converter circuit which is operative to convert a voltage derived from the telephone line to the voltages necessary to appropriately drive an RS232 output interface circuit. The converter includes a two-winding transformer which provides electrical isolation between the telephone line and the utilization apparatus. The converter is driven by a square wave signal having an unbalanced duty cycle which results in an unbalanced output at voltage levels appropriate for powering the output interface circuit. Preferably, the converter is driven by a 5 volt peak-to-peak square wave having a frequency of 50 kHz and with an unbalanced duty cycle of 60 percent positive and 40 percent negative cycles. The converter provides output voltages of about +5.5 volts and −3.5 volts for the interface circuit. The converter is enabled only in the presence of a valid carrier detect signal such that the output interface circuit provides carrier detect and received data outputs only in the presence of a valid received carrier.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
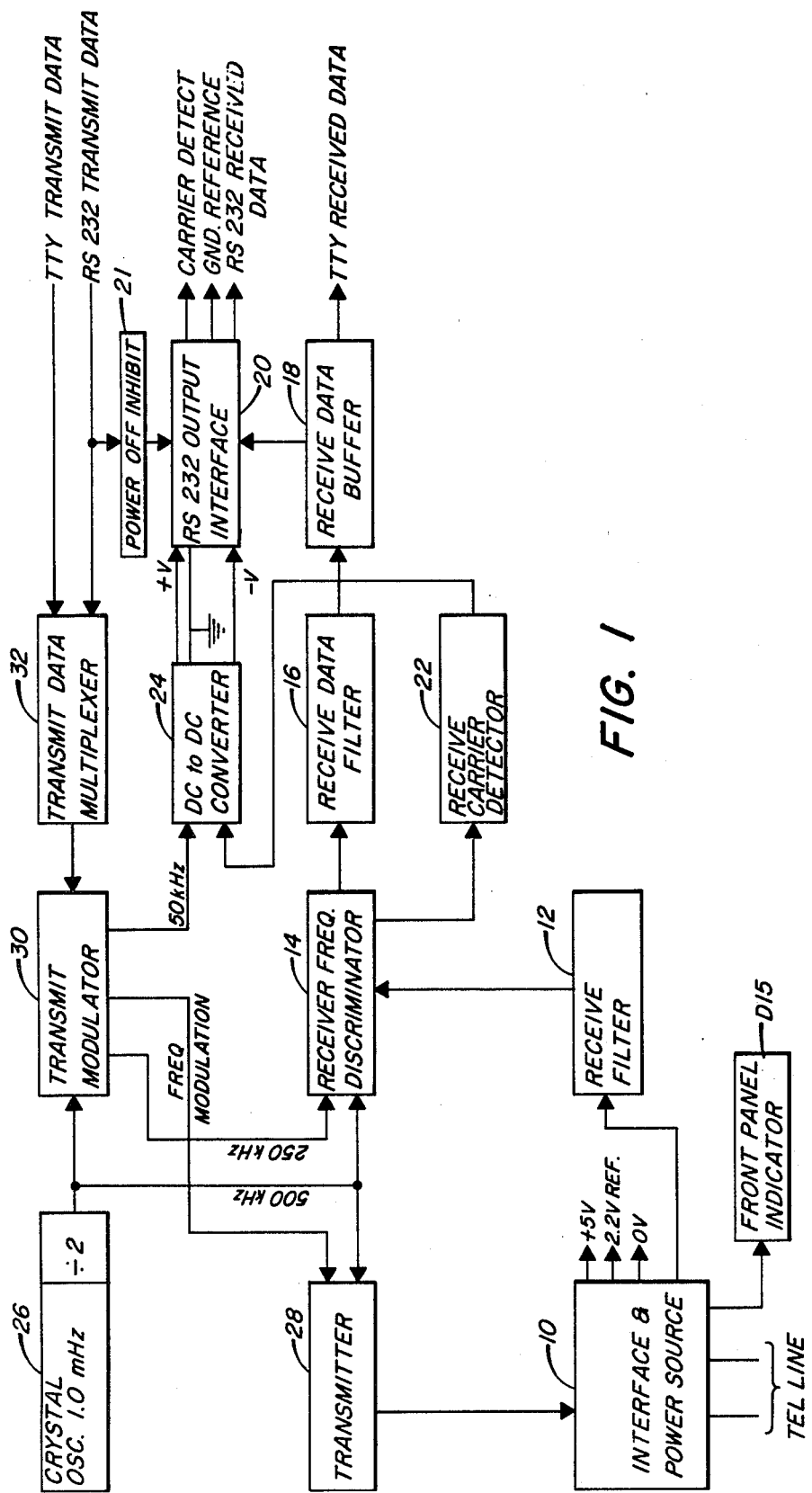
FIG. 1 is a block diagram of a preferred embodiment of a line-powered modem embodying the invention.

A line powered modem embodying the present invention is shown in FIG. 1. In the illustrated embodiment the modem is a type 103 modem which provides full duplex operation at transmitting and receiving rates up to 300 bits per second (baud) and employing two level frequency shift keyed (FSK) modulation. Two carrier frequencies are employed, one for transmission at a center frequency of 1170 Hz and the other for reception at a center frequency of 2125 Hz. To minimize power consumption, the modem is constructed of CMOS digital integrated circuits which have inherently low current requirements. The CMOS circuits are also relatively inexpensive, thereby permitting economical construction. The modem employs digital signal processing including digital synthesis of the transmitted frequencies and digital discrimination of the received frequencies to achieve highly accurate frequency stability at low power levels and in a compact and relatively inexpensive manner.

The modem is connected to and fully powered by the telephone line, and is also connected to a data terminal, business machine or other apparatus to and from which data is transferred. The modem provides electrical isolation between the telephone line and the utilization apparatus. The telephone line is connected to a telephone line interface and power source 10 which provides operating power derived from the telephone line to all modem circuits. This interface circuit 10 also couples signals from the telephone line for demodulation by the modem, and signals from the modem to the telephone line for transmission. In order to hold the telephone line in an off hook condition, a current in the range of 20-150 milliamperes must be drawn. The minimum load requirements for the telephone line are specified to be 8 volts drop at 20 milliamperes. As a result, the telephone line can provide a minimum of 160 milliwatts of power to circuitry connected thereto. An input impedance of 600 ohms must also be maintained to accord with telephone specifications. The modem described herein has a minimum power requirement of 5 volts at 17 milliamperes, or 85 milliwatts. This very low power consumption is well within the 160 milliwatts limit of available power from the telephone line.

The telephone line has a specified nominal DC level of 48 volts and a DC equivalent series resistance (minimum source resistance) of 400 ohms. The actual DC current on a particular line will depend on the resistance of that particular line, which is a function of the length of the line from the central office power source. Typically, the equivalent line resistance can be from near zero to about 1200 ohms. For the illustrated type 103 modem, the interface and power source 10 provides a regulated 5 volt output with respect to a common terminal and a regulated 2.2 volt output with respect to the common terminal which is employed as a reference voltage in the modem. The 2.2 volt reference is employed in the shunt regulator of the power source and as a voltage bias for the receiver operation. The circuit 10 is also operative to couple audio data signals received on the telephone line to the modem receiver, and to couple data signals from the modem transmitter to the telephone line for transmission to a remote receiver.

The interface and power source 10 can be considered as a shunt regulator across the load and a current regulator in series with the load. The shunt regulator functions much like a Zener diode and provides a voltage level which is substantially constant irrespective of variations in applied current. The current regulator provides a low DC resistance of about 10-20 ohms, and provides an AC impedance which is relatively high such that audio variations in line voltage cause no appreciable current change through the load. This current regulator serves as an active electronic circuit equivalent to the large inductor which would normally be required to separate the audio signals from the DC telephone line current.

Referring to FIG. 1, received signals from the telephone line are coupled by interface and power source 10 to a receive filter 12 which is a bandpass filter operative to limit the received signal spectrum to the desired band which is usually specified to be approximately 350 Hz centered at a frequency of 2125 Hz. The filter 12 includes an amplifier to provide an amplified output signal which is applied to a receiver frequency discriminator 14. This frequency discriminator includes a digital phase lock loop and is operative to provide a digital signal having a duty cycle representing the frequency of the signal from filter 12. The variable duty cycle signal is applied to a receive data filter 16 which removes unwanted harmonics and averages the variable duty cycle input signal to produce an output which is a linearly varying voltage which is directly proportional to the frequency of the received signal.

This signal from the data filter 16 is applied to a receive data buffer 18 which provides as an output TTY (teletypewriter) received data. The data buffer 18 also provides an output signal to an RS232 output interface 20 which provides as an output RS232 received data and a carrier detect signal. The receive data buffer 18 includes a slicer circuit operative to determine whether the voltage corresponds to a frequency above or below the 2125 Hz center frequency of the receiver band. If the analog voltage denotes a frequency above 2125 Hz, the data buffer 18 provides a voltage output level at the mark state. If the voltage denotes a frequency below 2125 Hz, the data buffer 18 provides an output voltage level at the space state.

The received data is provided by way of electro-optical isolators which achieve complete electrical isolation between the modem and the associated utilization apparatus. The data buffer 18 includes two electro-optical isolators which are part of an output buffer. One isolator is employed to provide a current switched between two levels, depending upon the mark or space state of the received data, for TTY equipment. The other isolator is employed to provide an RS232 data output by way of interface 20. The output interface 20 also provides a carrier detect signal in the presence of a valid carrier being received. In the 103 modem two criteria are employed for determining the validity of a received carrier. If there is sufficient energy in the receiver band, the presence of that energy is assumed to be a carrier from the transmitting site. Normally the level of discrimination is of the order of −46 DBM. Thus, if the received signal energy exceeds −46 DBM, and the frequency of the received energy is within a band of about 400 Hz centered at 2150 Hz, it is recognized to be a valid carrier.

The frequency discriminator 14 includes a level detector operative to detect signals above a predetermined level, and also includes circuitry for sensing within a predetermined frequency band. Typically, the threshold level of the discriminator is about −45 DBM and the frequency range is about 1950-2350 Hz. For recognition of a valid carrier signal, the signal level must exceed the discriminator threshold level and be within the discriminator band. The discriminator 14 provides to the carrier detector 22 a signal of one binary level upon detection of a valid carrier, and of a second binary level if no carrier is present or does not meet the detection criteria. Thus, the carrier detector 22 receives a bilevel signal from the frequency discriminator 14 indicative of the presence or absence of a valid carrier, and provides an enable signal to DC to DC converter 24 in the presence of a valid carrier signal. The converter 24 is driven by an unbalanced 50 kHz square wave signal from transmit modulator 30. The 50 kHz unbalanced signal has a duty cycle of 60 percent positive and 40 percent negative cycles.

Master timing is provided by a crystal oscillator and frequency divider circuit 26. The crystal oscillator is operative at 1 mHz and, after division, provides a 500 kHz clock signal to receiver frequency discriminator 14 and to transmitter 28 and modulator 30. A 1 mHz crystal is employed to implement the oscillator with available CMOS circuits operable at a voltage level of 5 volts for the intended signal rates. Since the maximum resolution required by the digital circuits is not more than 500 kHz, the 1 mHz crystal oscillator frequency is divided by a factor of two to provide a 500 kHz clock signal.

The transmitter frequency of 1170 Hz is digitally synthesized and provided by the transmitter 28. The FSK modulation is provided by transmit modulator 30. The TTY data or RS232 data to be transmitted is applied to a data multiplexer 32 which provides the data to modulator 30. The modulator is operative to frequency shift the transmitter carrier in a phase coherent manner to provide the FSK modulated signal which is applied via interface 10 to the telephone line for transmission to a compatible modem at the other end of the line. The modulator also provides a 50 kHz unbalanced square wave signal to drive the DC to DC converter. The modulator also provides a 250 kHz clock signal to the receiver frequency discriminator 14. The transmitter 28 includes a sinewave synthesizer, digital counters and digital-to-analog converter to generate an analog signal which after appropriate filtering is applied to the telephone line for transmission. The transmitted frequency is 1170 Hz±the frequency deviation caused by the mark or space states of the transmitted data.

The DC to DC converter 24 is operative to convert the 5 volt power signal derived from the telephone line to the voltages used to drive the RS232 interface circuit 20 which provides the interface signals to be applied to the associated utilization apparatus. The converter furnishes the minimum power necessary to ensure that the interface signals are of sufficient signal level to be properly received by the business machine or other utilization apparatus. The voltages provided by the converter are offset in the positive direction, since most RS232 receivers have a positive threshold in the range of +0.5 to 1.0 volt. The interface circuit 20 provides the carrier detect output signal and the RS232 received data signal to be applied to the associated apparatus. The RS232 interface is specified to have a minimum voltage of +3 volts or −3 volts, depending on the state of the output, and a minimum load of 3 Kohms. This requires a minimum of about 1 milliampere of current.

Figure 2:
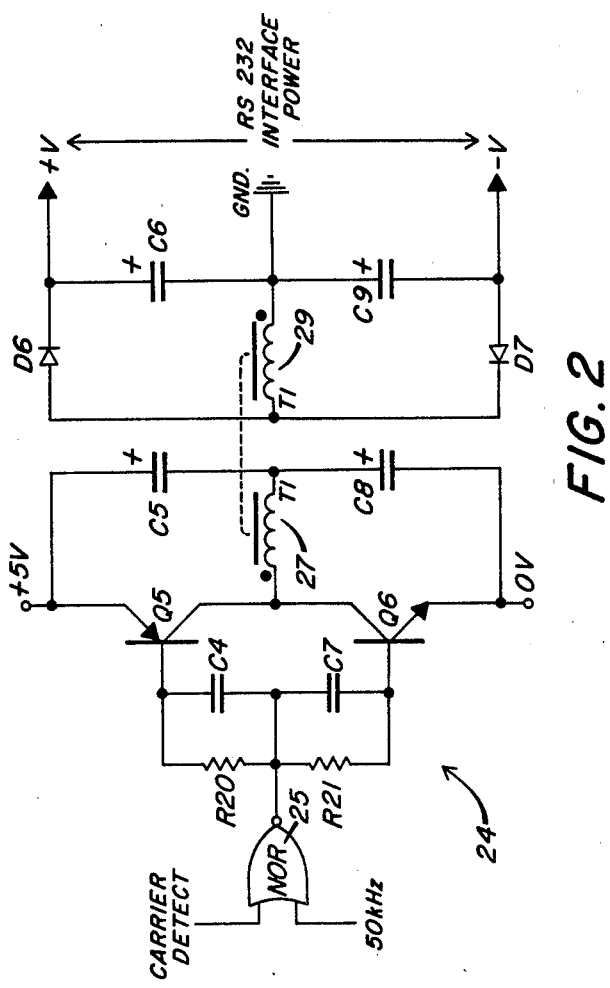
FIG. 2 is a schematic diagram of the DC to DC converter circuit in accordance with the invention.

The DC to DC converter 24 is shown in FIG. 2. The carrier detect signal from received carrier detector 22, and the 50 kHz square wave from transmit modulator 30 are applied via a NOR gate 25 to the base electrodes of respective transistors Q5 and Q6 via RC networks composed, respectively, of resistor R20 and capacitor C4, and resistor R21 and capacitor C7. The collectors of transistors Q5 and Q6 are connected to one end of a first transformer winding 27, the other end of which is connected via a capacitor C5 to the emitter of transistor Q5 and via a capacitor C8 to the emitter of transistor Q6.

The secondary winding 29 of transformer T1 is connected to anode of a diode D6 and to the cathode of a diode D7. The cathode of diode D6 is connected via a capacitor C6 to the other end of winding 29 and which is also connected via a capacitor C9 to the anode of diode D7. The two winding transformer T1 provides electrical isolation between the telephone line and the utilization apparatus to which the modem is connected. The primary winding of the transformer is driven by a 5 volt peak-to-peak square wave at a frequency of 50 kHz having an unbalanced duty cycle of 60 percent positive and 40 percent negative cycles. The voltage at the junction of capacitors C5 and C8 will assume the average of the voltage excursions, which is about +3 volts. The transformer secondary has a voltage step-up ratio of about 2:1 and will provide an unbalanced voltage output of about +6 volts and about −4 volts which are rectified by diodes D6 and D7 to furnish about +5.5 volts and −3.5 volts to operate the RS232 interface 20.

In view of the foregoing, it will be appreciated that the invention provides a DC to DC converter useful in a line powered modem to provide the appropriate data interface signals and which are derived from telephone line power. The invention is not to be limited except as indicated in the appended claims.

What is claimed is:

1. A telephone line powered modem comprising:
   a transmitter operative in response to data from a source to provide modulated data signals to the telephone line;
   a receiver operative to provide data signals derived from signals received on the telephone line;
   a power source operative in response to telephone line power to provide operating power for the transmitter and receiver while maintaining the current drawn from the telephone line and the voltage drop across the telephone line within specified limits;
   an output interface coupled to the receiver and operative to provide output signals compatible with utilization equipment coupled to the modem output; and
   converter means including a source of unbalanced square wave signals energizing the converter operative to provide predetermined unbalanced output voltages for operation of the output interface.

2. A line powered modem comprising:
   a transmitter operative in response to data from a source to provide modulated data signals to the telephone line;
   a receiver operative to provide data signals derived from signals received on the telephone line;
   a power source operative in response to telephone line power to provide operating power for the transmitter and receiver while maintaining the current drawn from the telephone line and the voltage drop across the telephone line within specified limits;
   an output interface coupled to the receiver and operative to provide output signals compatible with utilization equipment coupled to the modem; and
   converter means operative to provide predetermined unbalanced output voltages for operation of the output interface,
   wherein said converter means is enabled by a valid carrier signal provided by the receiver.

3. The modem of claim 1 wherein said output interface includes an RS232 output interface operative to provide RS232 data signals and a carrier detect signal.

4. The modem of claim 1 wherein said converter means includes a DC to DC transformer isolated converter.

5. The modem of claim 4 wherein the DC to DC converter includes:
   a two-winding transformer;
   input circuit for applying the unbalanced square wave signal to the primary winding of the transformer; and
   an output circuit for providing from the secondary winding of the transformer unbalanced rectified output voltages.

6. The modem of claim 5 wherein the input circuit includes a first stage for applying positive cycles of the unbalanced square wave signal to the primary winding of the transformer, and a second stage for applying negative cycles of the unbalanced square wave signal to said primary winding.

7. The modem of claim 6 wherein the output circuit includes a full wave rectifier.

8. A telephone line powered modem comprising:
   a transmitter operative in response to data from a source to provide modulated data signals to the telephone line;
   a receiver operative to provide data signals derived from signals received on the telephone line;
   a crystal controlled clock means for providing timing signals for said transmitter and receiver;
   a power source operative in response to telephone line power to provide operating power for the transmitter and receiver while maintaining the current drawn from the telephone line and the voltage drop across the telephone line within specified limits;
   an output interface coupled to the receiver and operative to provide output signals compatible with utilization equipment coupled to the modem output;
   a DC to DC converter circuit operative to provide predetermined unbalanced output voltages for operation of the output interface and including:
   a transformer providing electrical isolation between the telephone line and utilization equipment coupled to the modem; and
   means for providing an unbalanced square wave signal for an unbalanced duty cycle for driving said converter circuit.

9. The modem of claim 8 wherein the unbalanced square wave signal is provided by the modulator of said transmitter.

10. The modem of claim 8 wherein the converter circuit is enabled by a signal provided by said receiver upon detection of a valid carrier signal on the telephone line.

* * * * *